US008134061B2

(12) United States Patent
Feeney et al.

(10) Patent No.: US 8,134,061 B2
(45) Date of Patent: Mar. 13, 2012

(54) SYSTEM FOR MUSICALLY INTERACTING AVATARS

(75) Inventors: Robert J. Feeney, Glendale, CA (US); Jeff E. Haas, Glendale, CA (US); Brent W. Barkley, Glendale, CA (US)

(73) Assignee: Vergence Entertainment LLC, Glendale, CA (US)

( * ) Notice: Subject to any disclaimer, the term of this patent is extended or adjusted under 35 U.S.C. 154(b) by 93 days.

(21) Appl. No.: 12/573,747

(22) Filed: Oct. 5, 2009

(65) Prior Publication Data

US 2010/0018382 A1 Jan. 28, 2010

Related U.S. Application Data

(63) Continuation-in-part of application No. 11/738,433, filed on Apr. 20, 2007.

(60) Provisional application No. 60/745,306, filed on Apr. 21, 2006, provisional application No. 61/103,205, filed on Oct. 6, 2008.

(51) Int. Cl.
*G09B 15/00* (2006.01)
*G09B 15/02* (2006.01)
*G10H 1/00* (2006.01)

(52) U.S. Cl. ............ 84/477 R; 84/615; 84/618; 84/645; 84/653; 84/656

(58) Field of Classification Search ........................ None
See application file for complete search history.

(56) References Cited

U.S. PATENT DOCUMENTS 4,169,335 A 10/1979 Betancourt
4,857,030 A 8/1989 Rose
4,938,483 A 7/1990 Yavetz
4,949,327 A 8/1990 Forsse et al.
(Continued)

FOREIGN PATENT DOCUMENTS

WO WO-A 01/70361 9/2001
(Continued)

OTHER PUBLICATIONS

International Search Report and Written Opinion of the International Searching Authority in PCT application serial No. PCT/US2007/067161, mailed Apr. 9, 2008.

(Continued)

*Primary Examiner* — Marlon Fletcher
(74) *Attorney, Agent, or Firm* — Joseph G. Swan, P.C.

(57) ABSTRACT

Provided are, among other things, systems, methods and techniques for avatars to musically interact with each other. In one representative embodiment, a server is configured to host a virtual environment and various client devices communicate with the server over an electronic network, with each such client device configured to interact within the virtual environment through a corresponding avatar. A first client device accepts commands from a first user and, in response, communicates corresponding information to the server causing a modification of any of a first set of user-customizable visual characteristics of a first avatar that represents the first user. Similarly, a second client device accepts commands from a second user and, in response, communicates corresponding information to the server causing a modification of any of a second set of user-customizable visual characteristics of a second avatar that represents the second user. The first avatar performs a musical sequence that is based on current settings for: the first set of user-customizable visual characteristics and the second set of user-customizable visual characteristics.

18 Claims, 9 Drawing Sheets

U.S. PATENT DOCUMENTS

| | | | | |
|---|---|---|---|---|
| 5,438,154 | A | 8/1995 | Segan et al. | |
| 6,089,942 | A | 7/2000 | Chan | |
| 6,177,626 | B1 | 1/2001 | Ishibashi | |
| 6,560,511 | B1 | 5/2003 | Yokoo et al. | |
| 6,641,454 | B2 | 11/2003 | Fong et al. | |
| 6,729,934 | B1 | 5/2004 | Driscoll et al. | |
| 6,735,430 | B1 | 5/2004 | Farley et al. | |
| 6,822,154 | B1 | 11/2004 | Thai | |
| 7,025,657 | B2 | 4/2006 | Nishimoto | |
| 7,037,166 | B2 | 5/2006 | Shrock et al. | |
| 7,068,941 | B2 | 6/2006 | Fong et al. | |
| 7,208,669 | B2 * | 4/2007 | Wells et al. | 84/601 |
| 7,822,687 | B2 * | 10/2010 | Brillon et al. | 705/59 |
| 7,840,903 | B1 * | 11/2010 | Amidon et al. | 715/757 |
| 7,849,420 | B1 * | 12/2010 | Amidon et al. | 715/848 |
| 2002/0007314 | A1 * | 1/2002 | Maruyama | 705/14 |
| 2004/0038620 | A1 | 2/2004 | Small et al. | |
| 2004/0069122 | A1 | 4/2004 | Wilson | |
| 2004/0259465 | A1 | 12/2004 | Wright et al. | |
| 2005/0045025 | A1 * | 3/2005 | Wells et al. | 84/615 |
| 2005/0140185 | A1 | 6/2005 | McClintock et al. | |
| 2006/0143569 | A1 * | 6/2006 | Kinsella et al. | 715/752 |
| 2006/0162533 | A1 | 7/2006 | Grossman | |
| 2007/0168863 | A1 * | 7/2007 | Blattner et al. | 715/706 |
| 2007/0245881 | A1 * | 10/2007 | Egozy et al. | 84/609 |
| 2007/0247979 | A1 * | 10/2007 | Brillon et al. | 369/30.06 |
| 2008/0113797 | A1 * | 5/2008 | Egozy | 463/35 |
| 2008/0309675 | A1 * | 12/2008 | Fleury et al. | 345/581 |
| 2009/0165632 | A1 * | 7/2009 | Rigopulos et al. | 84/609 |
| 2009/0286605 | A1 * | 11/2009 | Hamilton, II et al. | 463/42 |
| 2010/0045697 | A1 * | 2/2010 | Reville et al. | 345/619 |
| 2010/0115425 | A1 * | 5/2010 | Bokor et al. | 715/757 |
| 2010/0300268 | A1 * | 12/2010 | Applewhite et al. | 84/610 |
| 2010/0300269 | A1 * | 12/2010 | Applewhite | 84/610 |
| 2010/0300270 | A1 * | 12/2010 | Applewhite et al. | 84/610 |
| 2010/0304863 | A1 * | 12/2010 | Applewhite et al. | 463/36 |
| 2011/0022965 | A1 * | 1/2011 | Lawrence et al. | 715/747 |
| 2011/0047267 | A1 * | 2/2011 | Syvain et al. | 709/224 |
| 2011/0066943 | A1 * | 3/2011 | Brillon et al. | 715/716 |

FOREIGN PATENT DOCUMENTS

| | | |
|---|---|---|
| WO | WO 01/86625 | 11/2001 |

OTHER PUBLICATIONS

Office Action in U.S. Appl. No. 11/738,433, mailed May 23, 2008.

Office Action in U.S. Appl. No. 11/738,433, mailed Sep. 25, 2008.

* cited by examiner

SYSTEM FOR MUSICALLY INTERACTING AVATARS

This application claims the benefit of U.S. Provisional Patent Application Ser. No. 61/103,205 filed Oct. 6, 2008, and is a continuation in part of U.S. patent application Ser. No. 11/738,433, filed on Apr. 20, 2007 (the '433 application), which in turn claims the benefit of U.S. Provisional Patent Application Ser. No. 60/745,306, filed on Apr. 21, 2006 (the '306 application). The foregoing applications are incorporated by reference herein as though set forth herein in full.

FIELD OF THE INVENTION

The present invention pertains to systems, methods and techniques through which users may interact over a network, such as the Internet, using musically interacting avatars.

BACKGROUND

A variety of different websites that provide two-dimensional (2-D) or three-dimensional (3-D) virtual worlds exist. Typically, each individual user interacts with others within these virtual worlds by manipulating the activities of an avatar that represents the user. In some cases, the user has the ability to choose certain visual characteristics of the avatar that will represent him or her, thereby customizing the appearance of his or her avatar to some extent. Currently, some of the most popular virtual-world sites are World of Warcraft™ and Second Life™, which mainly cater to adults. However, various other virtual-world sites also are available. Some cater to teenagers, others to pre-teens and still others (such as Club Penguin), to younger children. Although many of the non-adult sites appeal equally to boys and girls, some cater mainly to boys and others cater mainly to girls.

The conventionally available sites that permit interactions within a virtual world often provide the users with various sets of features and capabilities. For example, some permit the users to engage in commerce with each other, some provide educational content, some are theme-based (e.g., Franktown Rocks which is music-themed or Mokitown and Revnjenz which are car-themed) and some allow the users to play games with each other. However, additional features are always desirable, particularly in connection with allowing users to interact with each other in new and unique ways.

SUMMARY OF THE INVENTION

The present invention addresses this need by providing, e.g., a variety of additional new features that may be implemented within a virtual environment, including novel features through which avatars can interact musically with each other.

Thus, one embodiment of the invention is directed to a system for facilitating remote interaction, in which a server is configured to host a virtual environment and various client devices communicate with the server over an electronic network, with each such client device configured to interact within the virtual environment through a corresponding avatar. A first client device accepts commands from a first user and, in response, communicates corresponding information to the server causing a modification of any of a first set of user-customizable visual characteristics of a first avatar that represents the first user. Similarly, a second client device accepts commands from a second user and, in response, communicates corresponding information to the server causing a modification of any of a second set of user-customizable visual characteristics of a second avatar that represents the second user. The first avatar performs a musical sequence that is based on current settings for: the first set of user-customizable visual characteristics and the second set of user-customizable visual characteristics.

Another embodiment is directed to a system for facilitating remote interaction, in which a server is configured to host a virtual environment and various client devices communicate with the server over an electronic network, with each such client device configured to interact within the virtual environment through a corresponding avatar. A first client device accepts commands from a first user and, in response, communicates corresponding information to the server causing a modification of a musical style of a first avatar that represents the first user. Based on at least one of proximity to or interaction with a second avatar, the first avatar performs a musical sequence in a fusion musical style that is a combination of the musical style of the first avatar and the musical style of the second avatar.

A still further embodiment of the invention is directed to a system for facilitating remote interaction. A server is configured to host a virtual environment, and various client devices communicate with the server over an electronic network, each client device configured to interact within the virtual environment through a corresponding avatar. A first client device accepts user commands and, in response, communicates corresponding information to the server modifying at least one aspect of a first avatar, and a second client device accepts user commands and, in response, communicates corresponding information to the server modifying at least one aspect of a second avatar. The first avatar performs a musical sequence based on: (1) a visual characteristic of the first avatar and (2) a visual characteristic of the second avatar.

A still further embodiment is directed to a system for facilitating remote interaction. A server is configured to host a virtual environment, and various client devices communicate with the server over an electronic network, each such client device configured to interact within the virtual environment through a corresponding avatar. A first client device accepts user commands and, in response, communicates corresponding information to the server modifying at least one aspect of a first avatar. A second client device accepts user commands and, in response, communicates corresponding information to the server modifying at least one aspect of a second avatar. The first avatar performs a musical sequence based on a visual characteristic of the first avatar, and the second avatar performs a second musical sequence in accompaniment with the musical sequence performed by the first avatar, the second musical sequence being based on a visual characteristic of the second avatar.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

The present disclosure is divided into sections. The first section describes certain components of a system according to the preferred embodiments of the present invention. The second section describes certain exemplary techniques pertaining to musical interaction within a virtual environment. Subsequent sections provide additional information, as indicated by their headings.

System Components

Figure 1:
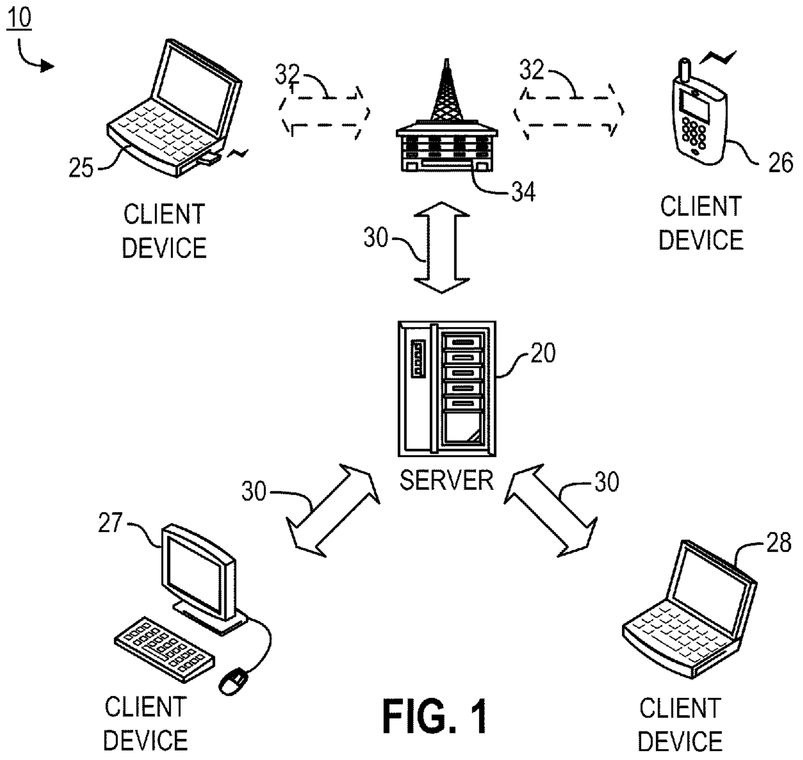
FIG. 1 is a block diagram illustrating the main components of a system according to a representative embodiment of the present invention.

FIG. 1 is a block diagram illustrating the main components of a system 10 according to a representative embodiment of the present invention. As shown, a central server 20 communicates with a variety of different client devices (e.g., client devices 25-28) through one or more wired networks 30 and/or wireless networks 32.

In the illustrated embodiment, server 20 is shown as being a single device. However, in alternate embodiments, server 20 is comprised of a number of individual server devices, e.g., collectively functioning as a single logical unit and/or with at least some of such individual server devices being geographically dispersed. In certain embodiments, multiple identical or similar servers are used, together with one or more load balancers.

Client devices 25-28 can include, e.g., desktop computers, laptop computers, netbook computers, ultra-mobile personal computers, smaller portable handheld devices (such as wireless telephones or PDAs), gaming consoles or devices, and/or any other device that includes a display and is capable of connecting to a supported network. Although only four client devices 25-28 are illustrated in FIG. 1, it should be understood that this depiction is merely exemplary, and many more client devices typically will be connected to server 20 at any given time, e.g., hundreds, thousands or even more such client devices 25-28.

Ordinarily, network 30 will include the Internet as the primary means through which client devices 25-28 communicate with server 20. However, in alternate embodiments of the invention, communications occur entirely or primarily over a local area network (hard-wired or wireless), a wide-area network, or any other individual network or collection of interconnected networks. In the present embodiment, a wireless base station (e.g., for a cellular-based wireless system) or access point (e.g., for communicating using any of the 802.11x standards) 34 connects various wireless devices (such as wireless devices 25 and 26) to the wired network 30 (e.g., the Internet), thereby allowing them to communicate with server 20 via wireless network 32.

Figure 2:
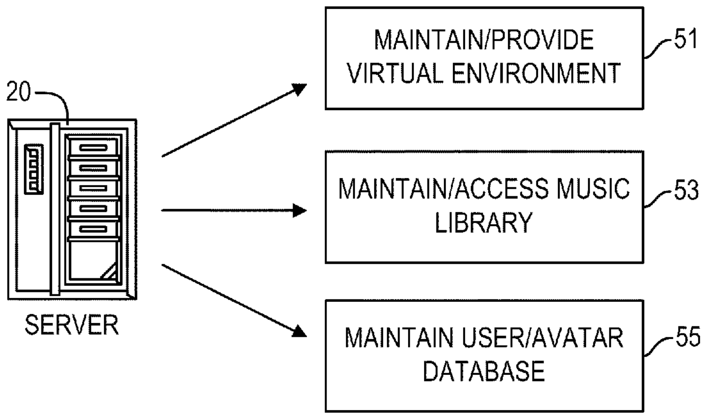
FIG. 2 illustrates certain functionality of a representative server.

FIG. 2 illustrates server 20 and certain functionality performed by it within system 10 in a representative embodiment of the present invention. One such function 51 is to maintain and provide a virtual environment within which users can interact with one another through their respective client devices 25-28.

For example, in one implementation the virtual environment is a virtual 3-D island, and each user can move a respective avatar around the island, encountering avatars representing other users in the process. In such a case, server 20 maintains a model of the island (or other virtual environment), with respect to topology, background animals and vegetation, man-made structures (such as buildings, paths, walkways and bridges) and surrounding environment (e.g., ocean). Server 20 then expresses portions of this model to individual client devices 25-28 based on the location of the avatar being manipulated by the particular client device, as well as the orientation in which the avatar is facing and/or looking.

At least some of the avatars preferably are provided with a private (or home) space, e.g., which is only accessible to other avatars upon invitation. This home space preferably is configured as an actual home, and the user is able to decorate it (e.g., through his or her avatar) as desired. For example, pictures may be hung on the walls, e.g., using: images uploaded into the virtual environment, photographs taken within the virtual environment (as discussed below), and/or images or artwork purchased with points won in the course of playing games within the virtual environment. Similarly, the user's home space can include a music collection, e.g., with albums or songs having been uploaded or purchased with points won within the virtual environment.

It is noted that points won within the virtual environment preferably also can be used to purchase other items for use in the virtual environment and/or to purchase physical items. In certain embodiments, points can be redeemed to acquire actual physical items and, simultaneously, the avatar is provided with the same (or corresponding) item in the virtual environment.

In certain embodiments, the virtual environment includes both a main environment (such as the island noted above, with private and public spaces) and one or more sub-worlds or sub-levels that the avatars may enter from the main environment. Preferably, such sub-worlds or sub-levels are accessed from portals within the main environment and provide individually themed experiences, such as the playing of particular games or contests. For example, such sub-worlds or sub-levels can be represented as contained within a building in the main environment and/or can be represented as an open environment with one or more portals between them and the main environment.

Another function 53 of server 20 in the present embodiment of the invention is the maintenance and accessing of a music library. Generally speaking, this music library (which is discussed in more detail below) is a repository for certain predefined musical sequences, segments and compositions with which the avatars are able interact with one another.

A still further function 55 of server 20 in the present embodiment is the maintenance of a database (also discussed in more detail below) of information regarding the various users (or players) and/or their respective avatars. For example, such a database preferably stores visual and/or musical characteristics pertaining to individual avatars that have been created by the respective players.

Figure 3:
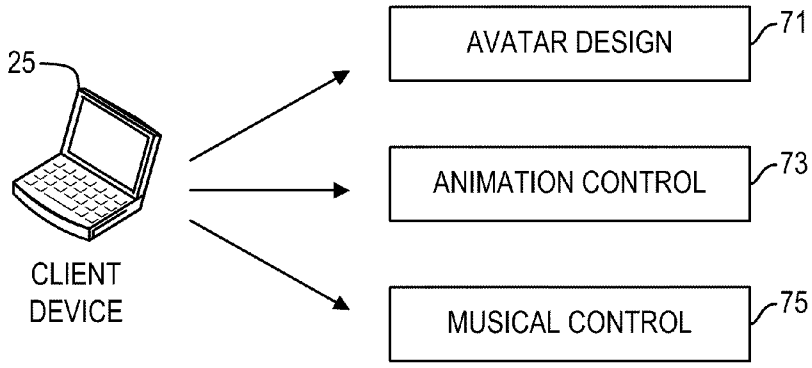
FIG. 3 illustrates certain functionality of a representative client device.

FIG. 3 illustrates a representative client device 25 and certain functionality performed by it within system 10, in accordance with a representative embodiment of the present invention. It is noted that, solely for ease of reference, a single client device typically is referred to herein as client device 25 and multiple client devices typically are referred to herein as client devices 25-28. However, such references are not intended to imply anything about the specific kinds or numbers of client devices that may be involved.

One preferred function 71 of client device 25 is the provision of a user interface for the creation, customization and design of the avatar that will represent the player within the virtual environment that is provided by server 20. In the preferred embodiments, as discussed in more detail below, each individual user has the ability to modify each of a variety of different visual characteristics of his or her avatar, e.g., including body type, color, appearance of eyes and plume. As also discussed in more detail below, at least some of these visual characteristics preferably affect corresponding musical characteristics in connection with the way the avatars interact musically with each other. For example, there might be one set of multiple user-customizable visual characteristics of the avatar that affect corresponding musical characteristics and another set of multiple user-customizable visual characteristics of the avatar that do not.

In certain embodiments, the users also have the ability to directly modify non-visual characteristics of their avatars. For example, in certain embodiments of the invention the user can assign to his or her avatar certain personality, characteristic or style codes, independent of any visual characteristics. Such personality or style codes, e.g., can be specified as strength or intensity values for specific personality traits and/or can affect the manner in which the user's avatar performs a given musical sequence (e.g., reflecting a more boisterous style or a more laid-back style) and/or other aspects of how the avatar appears (such as posture) or carries out tasks (such as manner of walking and/or dancing). Preferably, such personality or style codes, if used, are defined once and then remain constant unless subsequently modified by the user and/or by subsequent events (e.g., as described below). Certain embodiments also permit the user to define mood codes, which are valid only for the current session, but otherwise can have a similar effect on the way music is performed, how other actions are executed by the avatar, and/or how the avatar is portrayed. In this regard, the overall style for a particular avatar can be a combination of personality codes (which preferably are more constant over time) and mood codes (which preferably are more variable over time and therefore can allow the user to reflect his or her current mood).

In addition, in the preferred embodiments each user can choose or create a signature piece of music that will be attributable to his or her avatar. In this regard, each user preferably has the ability to select one of a set of pre-specified musical passages for his or her avatar. Alternatively, or instead, if the user wishes, he or she preferably can design a custom musical passage for his or her avatar, e.g., by using the keyboard or keypad of his or her client device 25 to play desired notes, with individual alphanumeric keys assigned to corresponding musical notes and/or by performing any desired mixing, looping and/or editing. In any event, the chosen or created signature piece preferably is performed by the avatar whenever instructed by the user (e.g., by hitting a specified key on the keyboard or keypad of the client device 25) or, in certain embodiments and/or if specified by the user, automatically upon the occurrence of a specified event (e.g., in response to another avatar's signature piece).

Lastly, in certain embodiments of the invention codes may be assigned to the avatar that indicate what relationships will be formed by the avatar. Such codes may be: selected directly by the user, assigned by server 20 based on the other (e.g., personality) codes provided by the user, assigned randomly by the server 20, or based upon any combination of the foregoing factors. In embodiments where the server 20 assigns the kinds of relationships that will be formed based on the assigned personalities of the different avatars, any conventional matchmaking algorithms or modifications thereof, e.g., may be used by server 20 for this purpose.

Another function 73 of client device 25 in the present embodiment is animation control for the user's avatar. More specifically, client device 25 preferably allows the user to control the movements of his or her avatar within the virtual environment provided by server 20. Such movements preferably can include gestures and expressions (e.g., with the avatar's arms or eyes), as well as movement of the avatar from one location to another within the virtual environment. In addition, animation control 73 can include control over verbal and/or non-verbal communications originating from the user's avatar (e.g., as discussed in more detail below).

A still further function 75 of client device 25 in the present embodiment is musical control. In this regard, in certain embodiments of the invention, the music performed by (or attributable to) a particular avatar is partly automated (e.g., based on the avatar's appearance or visual characteristics and, in some cases, based on visual characteristics of other avatars) and is partly under the control of the user (through a user interface of the user's client device 25). In certain specific embodiments discussed below, the user can, in real time and/or in advance, influence the music performed by his or her avatar through an interface of his or her client device 25. Similarly, in certain embodiments the user can provide replacement or additional music, in real time, through an interface of his or her client device 25.

It is noted that any of the functionality described herein as being performed through one of the client devices 25-28 can be implemented, e.g., using specialized client software on the client device itself (e.g., downloaded from server 20) or using software residing on the server and accessed via more general-purpose interface software (such as an Internet browser) on the client device 25. The preferred allocation of functionality depends upon anticipated processing power of the individual client devices 25-28, network latency and other engineering considerations.

More generally, it should be noted that in alternate embodiments of the invention, particular functionality and/or data storage is allocated, between the server 20 and the individual client devices 25-28, differently than as described above. For example, in one alternate embodiment, each client device 25 locally stores all of the customized information pertaining to its own avatar. Once again, the actual allocation of functionality and data storage preferably depends upon practical and engineering considerations.

In the preferred embodiments, when a user first wishes to participate in the virtual environment provided by server 20, he or she causes his or her client device 25 to download a special-purpose player from server 20. While the player is downloading and/or installing, the user preferably has the ability to choose and customize his or her avatar. For example, the user preferably can: choose a name for his or her avatar, design the appearance of the avatar, and (as described above) choose or create a signature musical piece for the avatar. More preferably, different visual characteristics of the avatar correspond to different musical characteristics, and the selection of an attribute for a particular visual characteristic also amounts to selection of a corresponding musical attribute for the corresponding musical characteristic.

Figure 4:
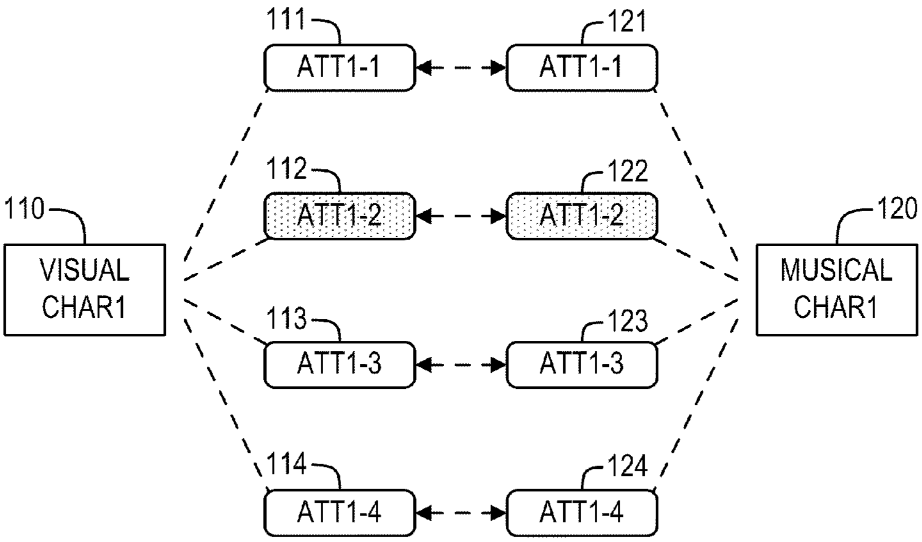
FIG. 4 conceptually illustrates the mapping of visual attributes, pertaining to a particular visual characteristic, to musical attributes, pertaining to a corresponding musical characteristic, according to a representative embodiment of the present invention.

A generic example of this concept is illustrated in FIG. 4. Here, a visual characteristic 110 has associated with it four possible attributes 111-114, from which the user may select one (e.g., attribute 112) to apply to his or her avatar. For example, the visual characteristic 110 might be body color and the four possible visual attributes 111-114 for this visual characteristic 110 might be: white, yellow, red and black, respectively. Preferably, prior to selecting the desired visual attribute, the user is notified that this particular visual characteristic 110 corresponds to a musical characteristic 120 and that each of the available colors corresponds to a different selection or attribute 121-124, respectively, for this musical characteristic 120. For example, the musical characteristic 120 might be voice or tone range, with the attributes 121-124 being soprano, alto, tenor and baritone/bass, respectively. Accordingly, in the example shown in FIG. 4, selection of the visual attribute yellow 112 would result in selection of alto voice 122.

Figure 5A:
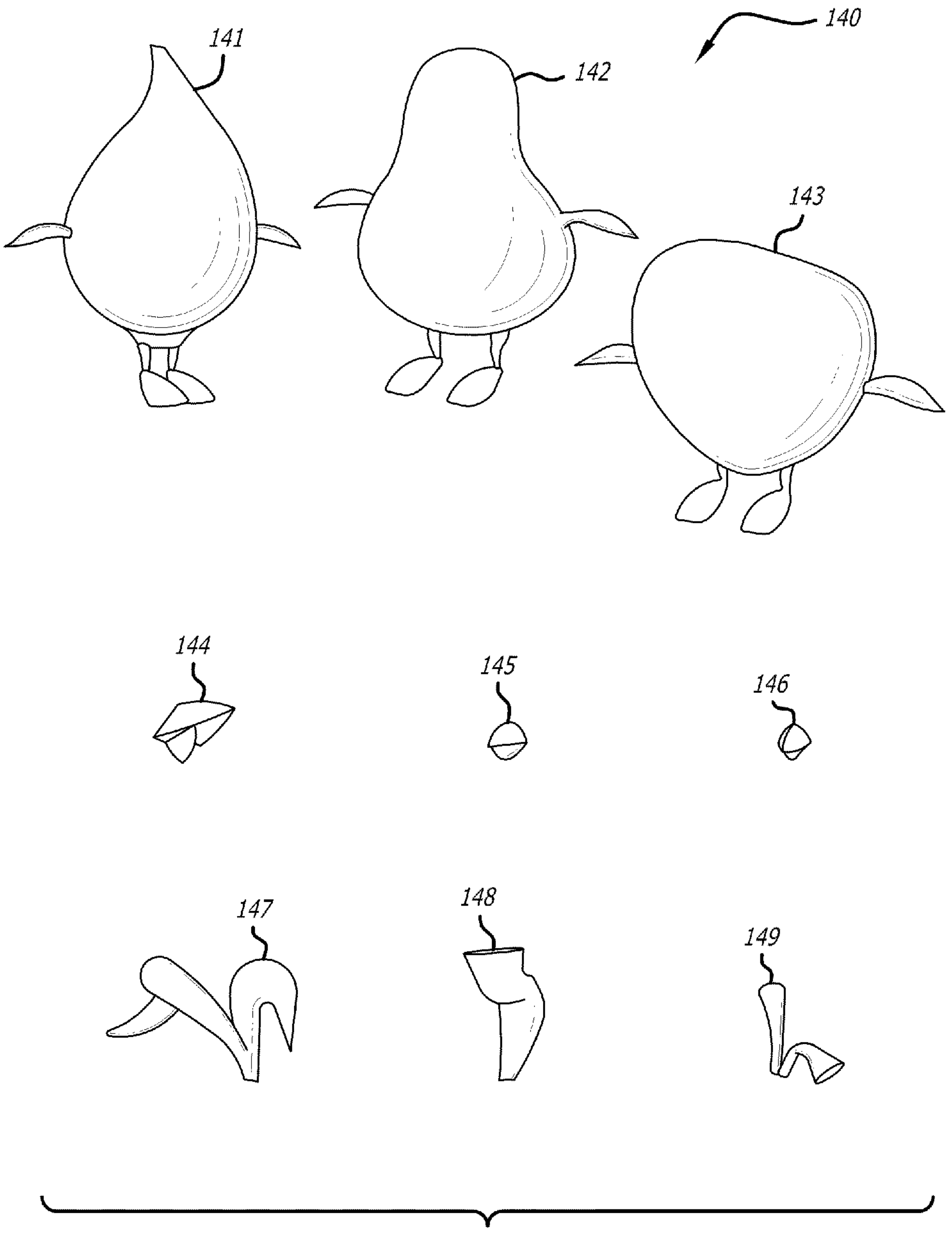
FIGS. 5A and 5B illustrate portions of a graphical user interface for a user to design an avatar, according to a representative embodiment of the present invention.
Figure 5B:
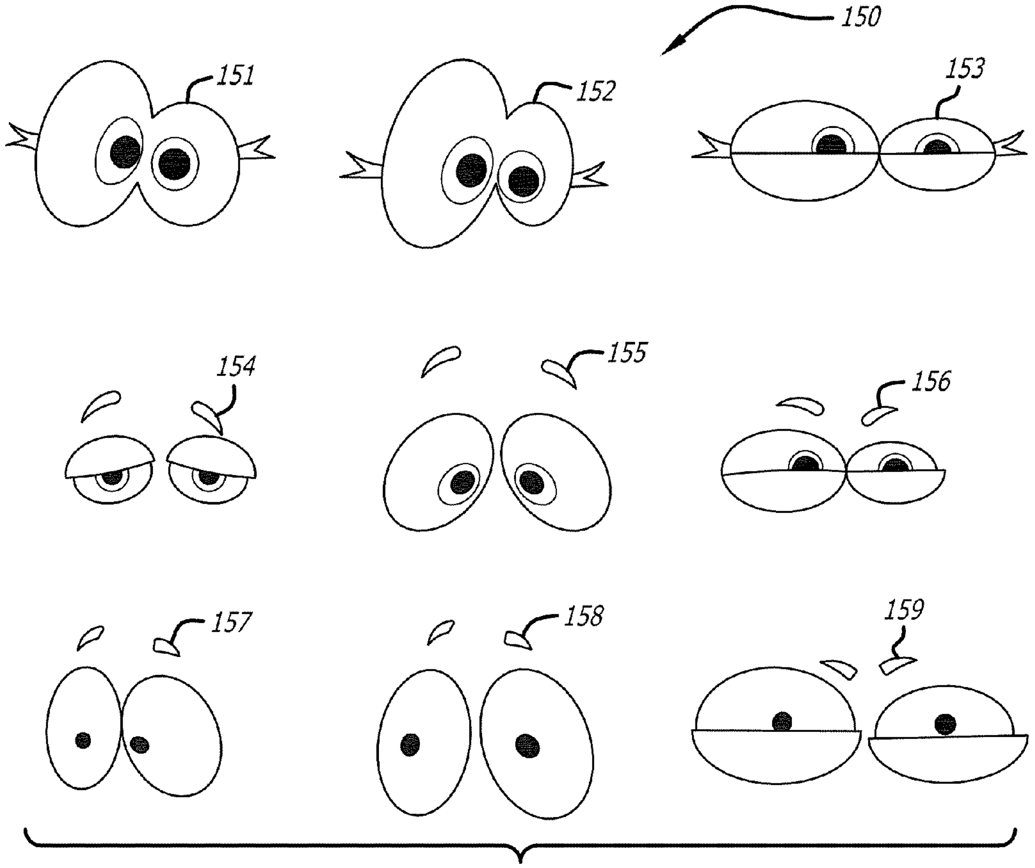

In the preferred embodiments, the user is able to select attributes for a variety of different visual characteristics of his or her avatar, from corresponding sets of available attributes. A portion of an exemplary user interface for this purpose is shown in FIGS. 5A and 5B. Specifically, in the first portion 140 of the user interface shown in FIG. 5A, the user is presented with: three choices 141-143 for body type, three choices 144-146 for beak design and three choices 147-149 for plume design. In the present embodiment, each of these choices may be made independently of the others. In addition, in the second portion 150 of the user interface shown in FIG. 5B, the user is presented with one of three sets of choices for how the avatar's eyes are portrayed. The particular set presented to the user in this embodiment depends upon which choice the user made for body design, as follows: if the user chose body design 141, then the user is presented with eyes 151-153 and allowed to choose one pair, if the user chose body design 142, then the user is presented with eyes 154-156 and allowed to choose one pair, and if the user chose body design 143, then the user is presented with eyes 157-159 and allowed to choose one pair. As noted above, the user also (or instead) may be able to choose one or more other visual characteristics, such as body color. More generally, it should be noted that the foregoing examples are merely exemplary, and in other embodiments the user is able to specify any other visual characteristics, either instead of or in addition to any of the visual characteristic specifically discussed herein.

As indicated in the example given above, the set of available attributes for a particular visual characteristic can be either (1) dependent upon the selection made for another visual characteristic or (2) independent of such other selections. For example, in FIG. 5A, the set of possible eyes (either set 151-153, said 154-156 or set 157-159) is dependent upon the body style (body style 141-143, respectively) that has been chosen; that is, selection of a different body style results in presentation of an entirely different set of available eyes to the user. On the other hand, the set of beaks 144-146 and the set of plumes 147-149 are the same irrespective of what body type had been selected.

Figure 6:
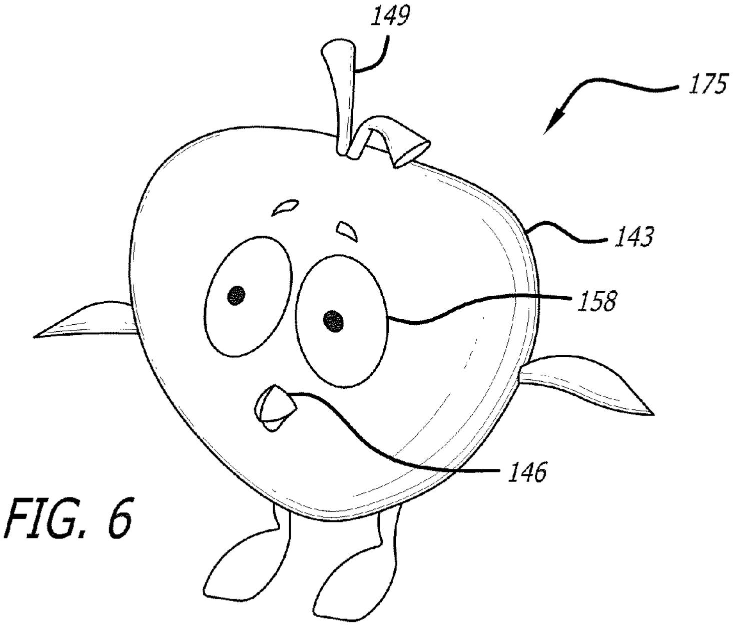
FIG. 6 illustrates an example of an avatar that has been designed by selecting individual attributes for certain specified visual characteristics.

FIG. 6 illustrates an example of a complete avatar 175 that has been designed through user interfaces 140 and 150. Specifically, in designing avatar 175, the user selected body type 143, beak 146, plume 149 and eyes 158 (from the set including eyes 157-159, which was presented based on body-type selection 143).

Unlike other conventional sites that permit a user to customize the appearance of his or her avatar, at least some of the visual attributes selected by the user preferably affect the way the resulting avatar interacts musically with other avatars and/or the way in which it plays music when it is not interacting with another avatar (e.g., when it is alone). The correspondence between individual visual attributes and corresponding musical attributes preferably is made known to the user through the graphical user interface (e.g., at the time that the user is designing the appearance of his or her avatar). More preferably, each visual characteristic preferably corresponds to a musical characteristic, e.g., with body type, color, plume type, eyes and beak each corresponding one of music style/feel (e.g., Jazz, ChaCha or Conga), voice/tone (e.g., soprano, alto, tenor, baritone or bass), instrument type (e.g., horn, strings or percussion), and/or any subcategories of any of the foregoing (e.g., New Orleans Jazz or Chicago Jazz).

As noted above, the visual characteristics and their sets of attributes preferably correspond on a one-to-one basis to musical characteristics and attributes, respectively. Accordingly, at least one reason that the sets of attributes that are made available for one visual characteristic would depend upon the selection made for a different visual characteristic might be that different musical attributes are available depending upon the attribute that previously was selected for different musical characteristic. If the designer of system 10 wishes to have one-to-one correspondence between visual attributes and musical attributes, then earlier selections preferably will affect the attribute sets that are available for later selections (e.g., if the user selects an attribute corresponding to a musical instrument class of "horn", then the set of attributes available for selection of specific musical instrument will be different than if the user had selected a musical instrument class of "string"). Alternatively, in other embodiments, the same set of visual attributes is available, independent of selections with respect to other characteristics, but their meaning in terms of corresponding musical attribute, can vary depending upon the selections that have been made with respect to other characteristics (e.g., a particular eye style will represent "trumpet" if a musical instrument class of "horn" previously has been selected, but the same eye style will represent "cello" if a musical instrument class of "string" previously has been selected).

Similarly, the sets of visual characteristics, as well as the musical or other characteristics to which they correspond, can be different depending upon a base choice made by the user, such as type of avatar. In one example, the user first is allowed to select from a set of animals and then the visual characteristics to be customized are specific to the chosen animal (e.g., one set of visual characteristics for birds and another set for dogs). However, even in such cases, the visual characteristics preferably map to a common set of musical characteristics.

In any event, after such choices pertaining to visual characteristics have been made, the corresponding attributes are assembled together to provide the overall visual representation of the avatar. In addition to affecting musical characteristics, any or all of such visual choices might also (or instead) affect other aspects of the avatar, such as the manner in which it walks and/or its dance style. Alternatively, or in addition, the user may have the ability to directly choose attributes for any or all of these other characteristics, independently of any choices regarding visual characteristics.

In this regard, it is noted that as used herein, the expressions "visual characteristics" and "visual attributes" refer to the appearance of some aspect of the avatar that exists and is visible even when the avatar is not moving, as opposed to action-based characteristics. One aspect of the preferred embodiments of the present invention is to provide the user an ability to customize one or more action-based characteristics (especially musical characteristics) of his or her avatar by simply customizing one or more of the avatar's visual characteristics.

Musical Interaction Techniques

Figure 7:
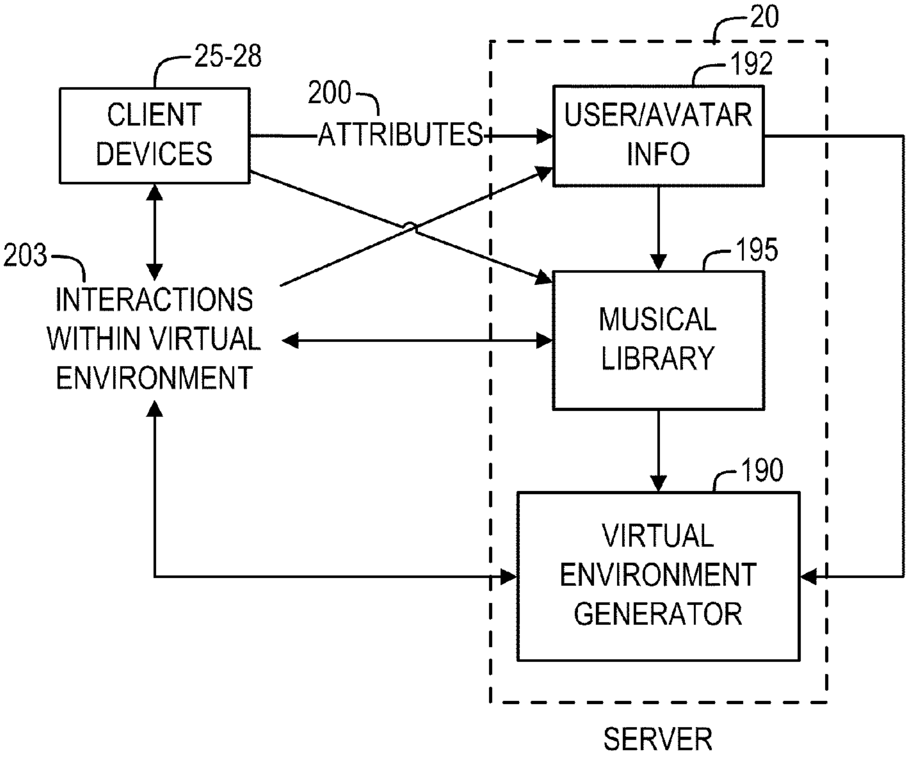
FIG. 7 illustrates certain communications between client devices and a server within a representative system of the present invention.

FIG. 7 is a block diagram illustrating certain communications between client devices 25-28 and server 20 according to a representative embodiment of the present invention, with particular emphasis on communications pertaining to musical interactions between avatars. As shown, in this embodiment server 20 includes a module 190 for generating the virtual environment. Typically, generation module 190 is a software module that generates the virtual environment based on an embedded model. That embedded model, in turn, typically will have been created, at least in substantial part, by the designers of system 10.

In keeping with the example given above, the virtual environment generated by module 190 primarily is configured as an island. As an avatar moves through the virtual environment, it encounters other avatars being manipulated by other users. As noted above, the various aspects of the virtual environment have been generated by server 20 or the designers of system 10, at least initially. However, in certain embodiments users are able to change the initial configuration of the generated virtual environment through their respective avatars, e.g., by using such avatars to create new structures or modify existing ones, to plant and/or maintain trees and other vegetation, to rearrange the locations of existing items, and the like. In response, server 20 correspondingly changes 51 its stored model of the virtual environment.

In the present embodiment, server 20 also includes a database 192 for storing information pertaining to the users of the system 10 and/or their avatars. Preferably, the information stored in database 192 includes identification (ID) codes for the avatars which, in turn, preferably are made up at least in part of the avatar attribute selections discussed above. In other words, all of such selected attributes, sometimes in combination with other information pertaining to the avatar, collectively identify the avatar to system 10.

Although stored by the server 20 in the present embodiment, as noted above, in alternate embodiments such avatar ID codes instead could be stored just locally on the user's client device. In any event, such ID codes preferably are provided to generator 190, which in turn then appropriately renders and animates, as well as providing music and other sounds for, the corresponding avatars. In certain embodiments, these avatar-related functions also are based on real-time manipulations by the user (in addition to the avatar ID codes).

As indicated, the server 20 of the embodiment shown in FIG. 7 also includes a database 195 for storing musical compositions, sequences and/or segments. In the preferred embodiments, the music is stored in database 195 in association with particular ID codes in data store 192 and/or in association with combinations of such ID codes.

Preferably, client devices 25-28 are able to interact with these various components of server 20, both directly and indirectly, in a number of different ways. For example, as already noted above, each user preferably is represented as an avatar within the virtual environment that has been created by generator 190. The user preferably is able to modify various characteristics of his or her avatar by selecting attributes 120 for the avatar, thereby directly resulting in corresponding changes to the avatar's ID codes within database 192. Although most of the avatar's characteristics described herein are manifested by the visual appearance of the avatar, in certain embodiments of the invention database 192 stores at least some avatar characteristics that are not represented visually.

The other main category of communications between the individual client devices 25-28 and server 20 in the current embodiments occurs through interactions 203 of the client devices 25-28 within the virtual environment created by generator 190 (or, more specifically, interactions of their corresponding avatars). In this regard, the user interface of each client device 25 preferably allows a corresponding user to move his or her avatar throughout the virtual environment and to cause that avatar to interact with avatars for other users. As discussed in more detail below, in certain embodiments of the invention, such interactions 203 can, e.g.: (1) result in musical performances using musical compositions, sequences and/or segments from music library 195 (which, in turn, preferably are based on the identification codes for the interacting avatars); and/or (2) affect the identification codes 192 for the interacting avatars.

In certain embodiments, the interactions 203 can result in the storage of additional musical compositions, sequences and/or segments into music library 195. For example, in certain circumstances, described in more detail below, new musical creations and/or variations provided by the users are added to library 195.

Similarly, as discussed above, in certain embodiments the interactions 203 can alter the virtual environment provided by generator 190, beyond just modifications to a user's own avatar. For example, similar to the Second Life™ site, certain embodiments may permit users (e.g., through their avatars) to build or change structures, which then become temporary or permanent parts of the virtual environment.

One aspect of the present invention is the automatic generation of musical sequences based on interactions between avatars within a virtual environment. Certain embodiments that incorporate such a feature are now described with reference to process 230 shown in FIG. 8. Preferably, the steps of the process 230 are performed in a fully automated manner so that the entire process 230 can be performed by executing computer-executable process steps from a computer-readable medium (which can include such process steps divided across multiple computer-readable media), or in any of the other ways described herein. Typically, all of the steps of the process 230 are implemented by server 20, although in certain embodiments one or more of such steps are performed (in whole or in part) by the client devices 25-28 that are controlling the interacting avatars.

As shown, the starting point for process 230 preferably is a trigger event 231. As discussed in more detail in the following steps, at least one musical sequence is initiated in response to a preferably predefined trigger event 231. The trigger event 231 can be any arbitrarily defined event, such as the pressing of a particular key on the keyboard of the corresponding client device 25. However, in other embodiments the trigger event 231 is related to an interaction between two avatars. For example, in one set of representative embodiments, the trigger event is (or includes) proximity of two avatars within the virtual environment. Such proximity can be specified as a minimum spatial distance and/or can involve visual proximity, i.e., the ability for the first avatar to see the second. In one particular embodiment, at least one potential trigger event 231 is simply the first avatar seeing the second, or both the first and second avatars seeing each other (e.g., with one avatar seeing another when its head is oriented in the direction of another and there are no visual obstacles between two avatars within the virtual environment).

Thus, in this latter case, a first user might see (through his or her own avatar's eyes) the avatar of a second user and also observe that the second avatar is looking in a different direction. In this case, the first user might cause his or her avatar to call out to, or otherwise attract the attention of, the second avatar in order to get the second avatar to turn toward the first user's avatar and thereby cause the trigger event 231. In still further embodiments, a potential trigger event 231 involves the two avatars waving to each other or otherwise signaling each other (i.e., something more than just seeing each other).

It is noted that the trigger event 231 can be defined in any desired way, to include any conjunctive and/or disjunctive sets of conditions or events. For instance, the trigger 231 can be defined as two avatars greeting each other, where the term "greeting" is defined to include, e.g., any of: waving, saying "hi" or "hello", making any other pre-defining greeting announcement or gesture, or saying any arbitrary words to the other avatar (e.g., while facing the other avatar within a sufficiently close distance, relative to the voice volume used). Finally, the trigger event 231 simply could be an indication from both avatars that they wish to perform a musical sequence or "jam". In other words, the beginning of a musical performance according to the present invention could be entirely manual (e.g., a specific instruction to start playing), automatic in response to a specified occurrence within the virtual environment, or a combination of both (e.g., clicking a "start" button in combination with a specified occurrence within the virtual environment). In any event, the steps of process 230 preferably are only performed upon the occurrence of a valid trigger event 231.

Figure 8:
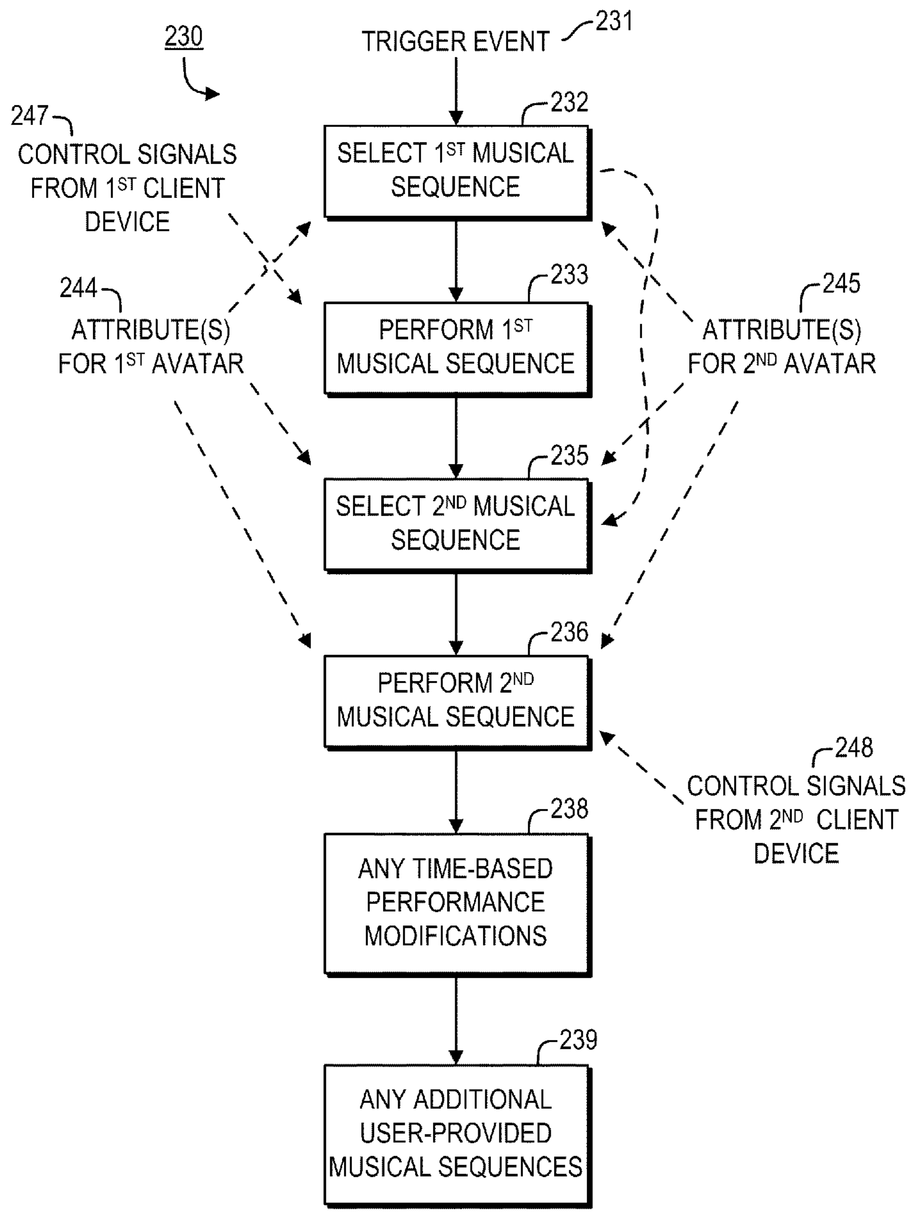
FIG. 8 is a flow diagram illustrating a first musical interaction process according to a representative embodiment of the present invention.

In step 232, a musical sequence is selected for the first avatar. As shown in FIG. 8, selection of the first musical sequence can be based on one or more (preferably visual) attributes 244 for the first avatar and/or one or more (again, preferably visual) attributes 245 for the second avatar. According to one representative embodiment, the musical sequence selected in this step 232 is based on a table lookup, using one or more pre-specified characteristics for the first avatar and one or more pre-specified characteristics for the second avatar, e.g., with a musical sequence having been previously stored for each possible combination of the corresponding attributes. As noted above, such characteristics preferably include visual-musical pairs.

For example, if the user has been allowed to select attributes for two different musical (or visual-musical pair) characteristics, where one of the characteristics (such as color) has four potential attribute values and the other characteristic (such as body type) that has three potential attribute values, then there are a total of 12 different combinations for the user's avatar. Assuming the same choices are available to the user of the other avatar, then there are 144 different combinations across the two avatars, meaning that in embodiments where characteristics of both avatars are considered, a nominal number of 144 different musical sequences may be stored, with the appropriate musical sequence being selected based on the attribute combination across the first and second avatars. Alternatively, if the selected musical sequence is based only on attributes of the first avatar, then a nominal number of 12 different musical sequences may be stored. On the other hand, fewer musical sequences may be stored if multiple attribute combinations point to the same musical sequence or, as discussed in more detail below, if one of the musical characteristics is to be expressed as a fixed real-time modification to a pre-stored base musical sequence. Similarly, additional musical sequences may be stored, e.g., where a particular combination of attributes maps to more than one musical sequence, in which case one of the matching musical sequences may be selected randomly, based on other conditions (e.g., time of day), or on any other basis.

It is noted that, at least with respect to certain musical characteristics, different attributes do not result in storage of different musical sequences in certain embodiments, but rather result in a fixed real-time modification to a pre-stored base musical sequence. For example, a base musical sequence can be stored and then modified (e.g., by changing the instrument sound, pitch, key or octave) based on of the particular attributes that have been selected for certain musical characteristics.

In step 233, the musical sequence selected in step 232 is performed by the first avatar. That is, the musical sequence is played in a manner such that it appears that the first avatar is performing it, e.g., by automatically causing the first avatar to perform movements and/or gestures that are in accordance with the first musical sequence (i.e., using visual cues), and/or by performing the musical sequence in the "voice" (e.g., musical instrument) of the first avatar (i.e., using audio cues). In the case of visual cues, such movements and/or gestures preferably are stored in association with the corresponding musical sequences. In the case of audio cues, the musical sequence either is stored with the appropriate audio cues or else is stored in a standard form and then modified based on the appropriate audio cues (e.g., using a synthesizer for the avatar's assigned musical instrument).

As discussed in more detail below, the performance of the musical sequence selected in step 232 preferably is not fixed, but rather varies based on the musical characteristics of the first avatar and, more preferably, also based on those of the second avatar. In this regard, each of the participating avatars preferably has a corresponding set of user-customizable visual characteristics, some or all of which having been modified by the user whom the avatar represents (with others potentially left at their default values). Thus, both the selection of the musical sequence (in step 232) and the way in which that musical sequence is performed (in step 233) preferably are based on current settings for the set of user-customizable visual characteristics (or, alternatively, user-customizable musical characteristics) of the first avatar and, more preferably, also based on current settings for the set of user-customizable visual characteristics (or, alternatively, user-customizable musical characteristics) of the second avatar. In the preferred embodiments, the user-customizable musical characteristics of the first avatar will have the primary influence.

In certain embodiments, the performance of the first musical sequence is fully automated, meaning that once it has been selected it is completely predetermined. However, in other embodiments the playing of the music is dynamically modified in real time. According to certain of such embodiments, one way in which such modifications are effected is to allow the user some control 247 over the playing of the music through the user interface of his or her client device 25.

For example, in certain embodiments the user interface of the client device 25 provides controls for modifying one or more aspects of the performance of the selected musical sequence, such as: modifying (increasing or decreasing) the tempo at which the selected musical sequence is played and/or for changing the actual melody (i.e., the combination of notes) that is played.

With respect to the latter, e.g., in certain embodiments, (1) a basic musical sequence is stored in library 195, together with permissible variations within the overall chord structure, and (2) keys of the alphanumeric keyboard or keypad for client device 25 control whether and how such melodic variations occur (e.g., generally controlling whether notes go higher or lower, but constrained as to the specific notes in accordance with the current chord, and/or controlling how long individual notes are held). In certain embodiments, the user also (or instead) is able to take over complete control of the melody by playing keys on the alphanumeric keyboard or keypad for client device 25, each of which corresponding to a specific note.

The foregoing embodiments emphasize the use of the standard user interface (typically an alphanumeric keyboard or keypad) that is provided with the client device 25. In alternate embodiments, the user is able to attach a peripheral device (e.g., via a hardwired connection, such as USB, or a wireless connection, such as Bluetooth) and then control the melody using such a peripheral device. In the preferred embodiments, such peripheral devices are configured so as to be similar or identical to an actual musical instrument, such as the actual musical instrument that the user's avatar is playing or replicating. Examples can include: electronic versions of a piano keyboard, a guitar, drums, a trumpet, a saxophone, a flute or a violin. It is noted that such peripheral devices can be particularly useful for musical education, permitting interaction within a virtual environment as contemplated by the present invention and actually learning about different musical instruments and/or music theory in the process.

For these purposes, it often will be desirable to modify the peripheral devices as compared to their ordinary musical instrument counterparts. For example, the piano keyboard peripheral of the present invention can be provided with light-up keys which indicate what notes currently are being played and/or what notes are permissible to be played in accordance with the current chord.

Similarly, the guitar peripheral, while otherwise resembling an actual guitar, can use light-up buttons in place of strings, along the frets and/or at the body where the strings normally would be played. With respect to the latter, buttons sometimes are preferred where only individual notes are to be played, and strings or equivalent sensors typically are preferred where strumming also is contemplated.

Still further, the wind instrument peripheral devices of the present invention can be provided with an airflow sensor, in place of a mechanical reed, in order to allow a child to immediately begin making music without having to learn the correct blowing technique. Such wind instrument peripheral devices also can be provided with light-up buttons to make the learning more intuitive.

As indicated above, the present invention contemplates several different modes of operation. In the first, primarily directed toward beginners, the user is able to influence the music that is being played without having complete control over each individual note. In the second stage, the user does control each individual note (at least for desired period(s) of time), potentially guided by light-up buttons. Although it is possible to use a standard alphanumeric keyboard or keypad for these purposes, in certain embodiments users are encouraged to obtain and use the peripheral devices, as better representing an actual instrument to be played and providing additional features (e.g., light-up buttons) that facilitate the learning process.

In step 235, a second musical sequence is selected for the second avatar. The considerations pertaining to this selection are similar to the selection of the first musical sequence, discussed above in connection with step 232. Here, the selection may be based on the (preferably visual) attributes of the second avatar or based on (again, preferably visual) attributes of both the first and second avatars. In addition, or instead, the selection may be based on the first musical sequence (i.e., the sequence selected in step 232). Generally speaking, because it is contemplated that the second musical sequence will be played concurrently with the first musical sequence and therefore that it should relate to the first musical sequence, it is preferred that the second musical sequence is selected in this step 235 based on at least one of: (1) one or more attributes of the first avatar or (2) the selected first musical sequence.

In step 236, the second musical sequence (selected in step 235) is performed by the second avatar. Once again, and throughout this description, the expression "performed by" is used in the same sense given above. Preferably, at least a portion (e.g., all, substantially all or at least a majority) of the second musical sequence is performed simultaneously with the first musical sequence (e.g., in accompaniment with it). Similar to the first musical sequence, in certain embodiments of the invention the second musical sequence also may be controlled 248 (e.g., modified) in real time, e.g., through a user interface attached to the client device 25 that controls the second avatar.

Similar to the discussion above, the performance of the musical sequence selected in step 235 (both in terms of the selection and the manner in which it is performed) preferably is not fixed, but rather varies based on the musical characteristics of the second avatar (which, in turn, preferably depend upon selected visual characteristics) and, more preferably, also based on those of the first avatar. In the preferred embodiments, the user-customizable musical characteristics of the second avatar will have the primary influence.

For situations in which both avatars are performing simultaneously with each other, if one or both of the users is using one of the separate musical instrument peripheral devices described above, with light-up buttons or another display interface indicating the notes being played or notes constituting the current chord, such user preferably has the ability to switch his or her musical instrument so as to reflect either the melody being performed by his or her own avatar or the melody being performed by the other avatar. However, each user preferably at most only has the ability to control the melody performed by his or her own avatar.

In the discussion above and also in FIG. 8, steps 235 and 236 are indicated as occurring after steps 232 and 233. However, it should be noted that steps 235 and 236 instead can occur prior to or even simultaneously with steps 232 and 233. In the latter case, for situations in which both avatars are to play musical sequences, the overall composition, defined by the two musical sequences, preferably is selected based on the combination of (preferably visual) attributes (e.g., user-selected visual attributes) of the two avatars. For example, the composition may be selected and/or performed based on the musical instruments represented by the two avatars and a fusion of their two styles.

It is noted that a musical composition may be selected in whole from an existing music library (e.g., library 195) or may be selected by assembling it on-the-fly using appropriate musical segments within the library 195. In either case, either entire musical compositions or individual musical segments that make up compositions may have associated with them identification code values (or ranges of values) to which they correspond (e.g., which have been assigned by their composers). Accordingly, in one embodiment selecting an entire composition involves finding a composition that matches (or at least comes sufficiently close to) the identification code sets for all of the avatars that will be performing together. In another embodiment, a subset of musical segments is selected in a similar way, and then the individual segments are combined into a composition.

In this latter regard, the ways in which individual musical segments can be combined into a single composition preferably depend upon how the individual musical segments have been composed. For example, when composed using a simple chord set, it often will be possible to combine different musical segments in arbitrary (e.g., random) orders. In one embodiment, each of the avatars performs its 8 bars of a tune which, when played together in sequence, constitute harmony and melody. In another embodiment, the 8 bars are shuffled randomly and can be played in any arbitrary sequence; when two such shuffled sequences are played together, they constitute a harmony and a melody; this preferably is accomplished by composing the music with a very simple set of chords.

In a more complicated embodiment, the individual segments within library 195 are labeled to indicate which other musical segments they can be played with and which other musical segments they can follow (or be followed by). In such a case, the various parts performed by the different avatars are assembled in accordance with such rules, preferably using a certain amount of random selection to make each new musical composition unique.

In alternate embodiments, the selection of a musical composition is based on the identification codes within database 192 for fewer than all of the avatars participating. For example, in some cases, the selection is based on the identification codes within database 192 for just one of such avatars, and in other cases the selection is independent of any such identification codes. As discussed in more detail below, in certain embodiments the avatars' performance styles are modified based on the musical composition to be played, as well as the identification codes within database 192 of the other avatars with which they are performing.

It is noted that steps 232 and/or 235 can continue to be executed to provide future portions of the composition while the current portions are being played in steps 233 and/or 236 (i.e., so that both steps are being performed simultaneously, either using multiple processors or using a multi-threaded environment). One advantage of this approach is that it allows for adaptation of the composition based on new circumstances, e.g., the joining-in of a new avatar while the composition is being played.

The participating avatars can cooperatively play a single composition in any of a number of different ways. For example, the avatars can all play in harmony or otherwise simultaneously. Alternatively, the avatars can play sequentially, such as where one avatar sings "Happy . . . ", another sings " . . . Birthday . . . ", a third sings " . . . To . . . ", a fourth sings " . . . You . . . " etc. Still further, any combination of these playing patterns can be incorporated when multiple avatars are performing a single composition. It is noted that the avatars can perform music by simulating a musical instrument and/or by actually singing, e.g., in a human voice or a cartoonish human-like voice.

The foregoing discussion generally contemplates an example in which two musical sequences, corresponding to the two interacting avatars, are performed in concert. However, in certain embodiments or certain situations, just a single avatar will perform a musical sequence in response to a particular interaction, e.g., so that steps 235 and 236 are omitted.

Similarly, although the foregoing sequence contemplates an interaction between two avatars, in certain embodiments, and/or certain circumstances within a particular embodiment, more than two avatars interact with each other and, in response, simultaneously perform a musical composition together, e.g., so that three or more musical sequences are performed (e.g., simultaneously or variously simultaneously and sequentially) by three or more corresponding avatars. In one such example, two avatars come into contact with each other, begin performing, a third avatar joins the group, and then the third avatar joins in by performing a third part of the overall musical composition.

The foregoing discussion largely concerns various techniques by which avatars may perform automatically, either alone or with each other, in response to a trigger event 231. Such automatic play preferably is based on pre-stored musical sequences that are accessed in response to the ID codes of the participating avatars stored within database 192. In addition, in step 238 modifications to the performances preferably can occur over time. As already noted above, one way in which such modifications can occur is for the individual users to have some control over the musical sequences performed by their corresponding avatars, e.g., by manipulating user interfaces of their corresponding client devices 25-28. Other techniques, which generally involve automated modifications to the music being played, are described below, e.g., in reference to FIGS. 9-12.

In step 239, any additional user-provided musical sequences are added to the overall performance. As already discussed above, in certain embodiments the users have some control over the otherwise fully automated performance of their corresponding avatars. In addition, in certain embodiments the users also (or instead) are able to add entirely new musical sequences to the overall performance, e.g., by creating such new musical sequences (either arbitrarily or within specified constraints, similar to the manner described above for modifying the performances of their avatars) through user interfaces attached to their client devices 25-28. Thus, for example, with two avatars performing together, each of the two corresponding users might provide his or her own musical part, resulting in a composition having up to four parts.

The foregoing discussion talks about the ability of users to modify the performances of their avatars and/or to add additional musical parts while one or more avatars are performing music. Another aspect of certain embodiments of the present invention is for the users to modify and/or create music off-line (i.e., not in real time). For example, in some embodiments users are able to download musical sequences, such as those musical sequences associated with the user's own avatar. Then, the user can modify the downloaded musical sequence, e.g., using any of the techniques described above. However, because such modifications are not occurring in real time, the user preferably has the ability to: slow down the musical sequence, edit different portions in arbitrary sequences, potentially view the sheet-music representation of the musical sequence, edit in any of a variety of different ways (e.g., using a peripheral musical instrument or altering notes within the sheet-music representation), and/or try out different revisions/versions of the same portion.

Similar considerations apply to embodiments in which the users are able to create entirely new musical sequences. However, in the context where such new musical sequences are contemplated to be played, at least in some situations, along with the musical sequence performed by another avatar, the new musical sequence preferably is required to fit within a specified chord template. Once again, all of the techniques discussed above for generating a new musical sequence or for modifying an existing musical sequence, either in real-time or off-line, can be used for this purpose as well.

Once the user is satisfied with his or her modifications and/or new creation, in certain embodiments the user has the ability to save the new musical sequence for future playing by his or her avatar. On the other hand, in some embodiments the saving of such new musical sequences, at least for some purposes, is regulated through the server 20. For instance, particularly in embodiments where the musical sequences within database 195 are to be made available for all avatars within system 10, inserting new musical sequences (irrespective of whether they are derivative of existing sequences or entirely new creations) requires approval. For example, final approval may require any combination of a voting process by the other users and/or approval by the administrators of system 10. Some form of involvement by the other users often is preferable, in order to facilitate community. In addition to, or instead of, group approval, community involvement may be enhanced by structuring the approval process as a contest in which only the winning musical segments are added to the database 195.

As is apparent from the foregoing discussion, the steps of the process 230 can be performed in any of a variety of different sequences, and in some cases multiple steps can even be performed concurrently. Similarly, the entire process 230 can be repeated, either automatically (such as where a single trigger event 231 automatically causes multiple compositions to be performed), or in response to another occurrence of the trigger event 231.

Figure 9:
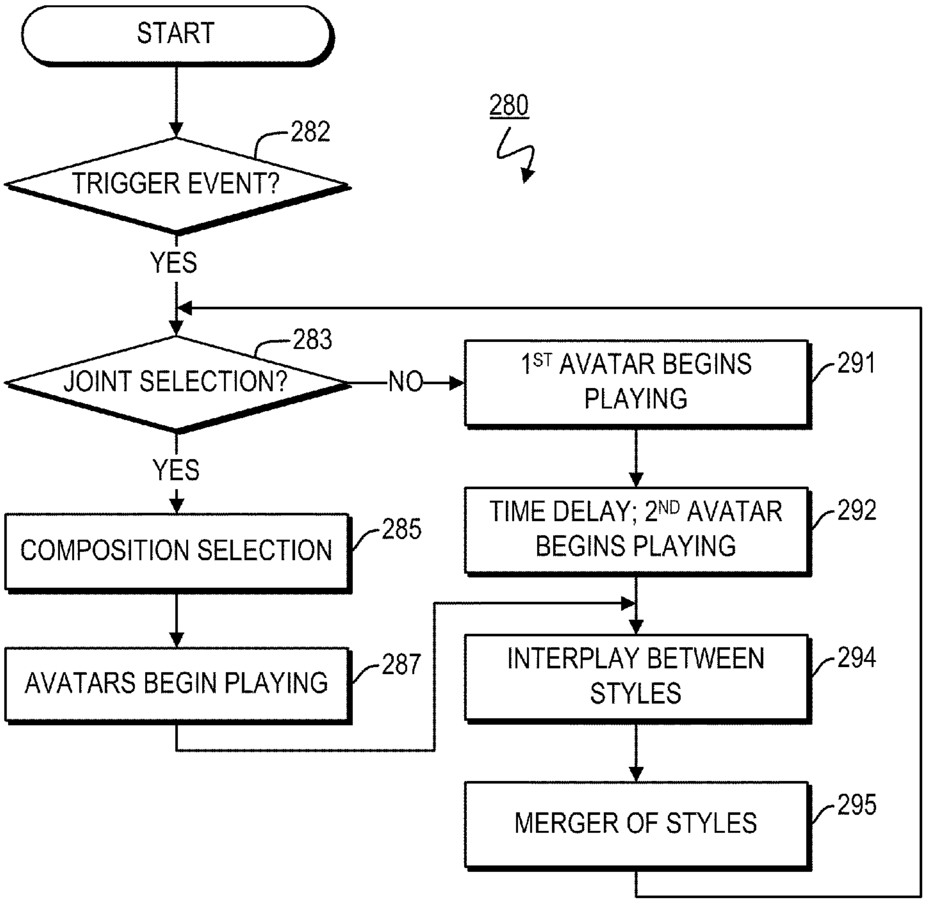
FIG. 9 is a flow diagram illustrating a second musical interaction process according to a representative embodiment of the present invention.

FIG. 9 is a flow diagram showing an interaction process 280 between two avatars according to a representative embodiment of the present invention. In the preferred embodiments, the steps of the process 280 are performed in a fully automated manner (e.g., by server 20) so that the entire process 280 can be performed by executing computer-executable process steps from a computer-readable medium (which can include such process steps divided across multiple computer-readable media), or in any of the other ways described herein.

Initially, in step 282 a determination is made as to whether a trigger event 231 has occurred. If so, processing proceeds to step 283.

Next, in step 283 a determination is made as to whether a composition will be selected based on the ID codes (e.g., in database 192) for the two avatars. In the preferred embodiments, this decision is made based on circumstances (e.g., whether one of the avatars already was playing when the trigger event 231 for the second avatar occurred in step 282), the identification codes for the two avatars (e.g., one having an ID code indicating a strong personality or an excited mood might begin playing without agreement from the other) and/or a random selection (e.g., in order to keep the interaction dynamics fresh). If the determination in step 283 is affirmative, then a composition is selected in step 285 (e.g., based on both sets of identification codes), and the avatars begin playing together in step 287.

On the other hand, if agreement was not reached, then in step 291 one of the avatars begins playing. After some time delay, in step 292 the other avatar joins in. This approach simulates a variety of circumstances in which one musician listens to the other and then joins in when he or she identifies how to adapt his or her own style to the other's style. At the same time, the delay sometimes can provide additional lead time for generating the multi-part musical composition.

In either event, once the two avatars have begun playing together, in step 294 any of a variety of different musical interplays can occur between the two avatars. For example, and as discussed in more detail below, each of the avatars preferably alternates between its own style and some blend of its style and that of the other. At the same time, each of the avatars can take turns dominating the musical composition (and therefore reflecting more of its individual musical style) and/or the avatars can play more or less equally, either merging their styles or playing complementary lines of their individual styles. In addition, the musical composition sometimes can vary between segments where the avatars are playing together (e.g., different lines in harmony) and where they are playing sequentially (e.g., alternating portions of the same line, but where each is playing according to its own individual style).

Eventually, in step 295 the two styles merge closer together. That is, the amount of variance between the two avatars tends to decrease over time as they get used to playing with each other. Upon completion of the current musical composition, processing returns to step 283 to repeat the process. In this way, a number of different compositions can be played with a nearly infinite number of variations, thereby simulating actual musical interaction. Moreover, with an appropriate amount of randomness introduced into the system 10, a sense of spontaneity often can be maintained.

It is noted that the foregoing example describes just one way in which two avatars interact with each other. All of the various concepts discussed herein can be implemented in different combinations to achieve different playing patterns. Also, the foregoing examples primarily focus on interactions between two avatars. However, any number of avatars may interact with each other in any of the ways described herein.

Figure 10:
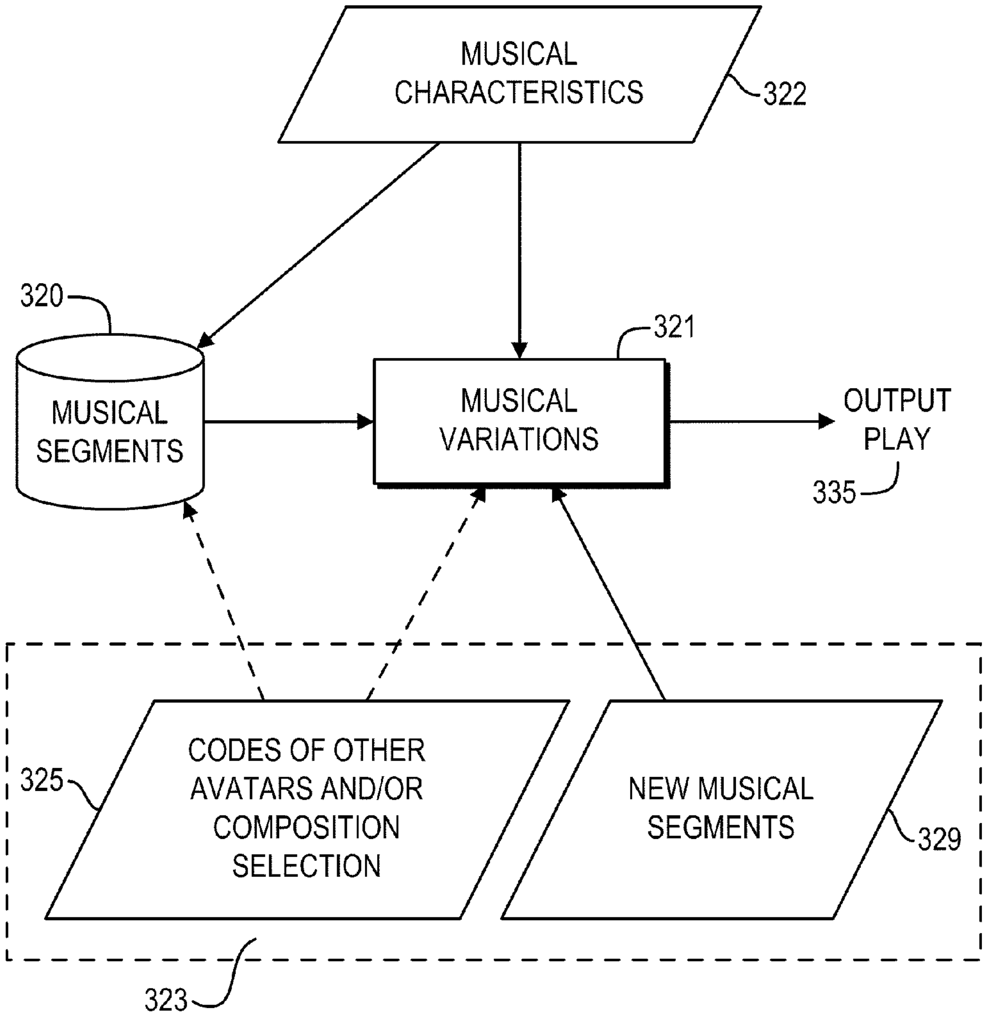
FIG. 10 illustrates a block diagram of a system for an individual avatar to produce music according to a representative embodiment of the present invention.

FIG. 10 illustrates a block diagram of a system for an individual avatar to produce music according to a representative embodiment of the present invention. Generally speaking, there are two main components to the musical generation system. First, musical segments are selected, typically from a database 320 (such as musical library 195) and then play patterns and variations are applied 321, determining the final form of the music 335 that is output.

The selection of the musical segments preferably depends upon a number of factors, including the musical characteristics 322 of the subject avatar and other information 323 that has been input from external sources (e.g., via any of the client devices 25-28 or an administrator of server 20). One category of such information 323 preferably includes information 325 regarding the identification codes (e.g., in database 192) of the other avatars that are to perform with the current avatar and/or regarding the musical composition that has been selected. As noted above, different musical segments (e.g. entire compositions or portions thereof) may be selected depending upon the nature of the particular group of avatars that are to perform together.

For this purpose, stored musical segments preferably have associated metadata that indicate other musical segments to which they correspond. In addition, in certain embodiments, the stored musical segments have a set of scores indicating the musical styles to which they correspond. At the same time, in certain embodiments the avatars also have a set of scores (e.g., as part of their ID codes) indicating the amount of musical influence each genre has had on it. Thus, for example, if the current avatar is playing with another avatar that has a strong country music style or influence (e.g., a high code value in the country music category), then the current avatar is more likely to select segments that have higher country music scores (i.e., higher code values in the country music category). Similarly, if the base composition already has been selected (e.g., without input from the current avatar), then the segments selected by the current avatar preferably are matched to that composition, in terms of style, harmony, etc.

As to the selection and application of musical variations 321, it is noted that each stored musical segment preferably can be played in a variety of different ways. For example, some of the properties that may be modified preferably include overall volume (which can be increased or decreased), range of volume (which can be expanded so that certain portions are emphasized more than others or compressed so that the segment is played with a more even expression), key (which can be adjusted as desired), musical instrument, voice or tonal range and tempo (which can be sped up or slow down). Generally speaking, the key and tempo are set so as to match the rest of the overall musical composition. However, the other properties may be adjusted based on the existing circumstances.

Once again, the adjustment of such properties preferably depends upon the musical (e.g., style) characteristics 322 of the subject avatar as well as information 325 regarding the identification codes 102 of the other avatars that are to perform with the current avatar and/or regarding the musical composition that has been selected. In addition, new musical segments 329 may be provided from outside sources that may be incorporated into the overall music 335 that is being performed. In one example, an avatar temporarily is given access to a set of country music segments that can be incorporated into its musical output 335. In this particular case, such new musical segments 329 are only used in the current session. However, in alternate embodiments, one or more of such new musical segments 329 are then associated with the music database 320 for the current avatar, so that they can also be used in future playing sessions.

Figure 11:
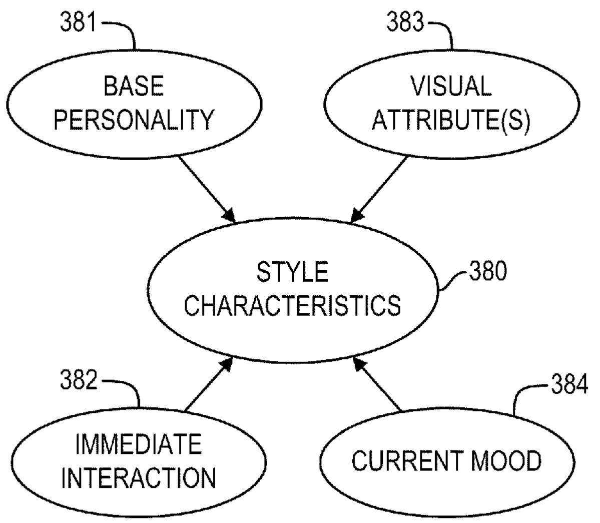
FIG. 11 illustrates a block diagram showing the makeup of a current music-playing style according to representative embodiment of the present invention.

FIG. 11 illustrates a block diagram showing the makeup of a current music-playing style 380 for a given avatar according to representative embodiment of the present invention. As noted above, several different factors may influence how a particular avatar plays music in the preferred embodiments of the invention, and any or all of such factors also may be used when selecting musical segments from database 320.

One of those factors is the base personality 381 of the avatar, e.g., from the set of identification codes (e.g., within database 192) for the avatar. For example, such ID codes might include a score for each of a number of different musical genres (e.g., country, 50s rock, 60s folk music, 70s rock, 80s rock, disco, reggae, classical, hip-hop, country-rock crossover, hard rock, progressive rock, new age, Gospel, jazz, blues, soft rock, bluegrass, children's music, show tunes, Opera, etc.), a score for each different cultural influence (e.g., Brazilian, African, Celtic, etc.) and a score for different personality types (e.g., boisterous or laid-back). As discussed below, the base personality codes 381 preferably remain relatively constant but do change somewhat over time. In addition, the user preferably has the ability to make relatively sudden changes to the base personality codes 381, e.g., by modifying such characteristics via the user interface on his or her client device 25.

Another factor potentially affecting the current style characteristics 380 is the current mood 384 selected for the avatar by the user it represents. For example, one or more values may be selected from a group that includes any or all of: happy, sad, pensive, excited, angry, peaceful, stressed, generous, aggressive, etc.

Another factor potentially affecting the current style characteristics 380 is the selection of visual attributes 383 for characteristics, such as body style, color, eyes, beak and/or plume, that are linked to corresponding musical characteristics. In certain embodiments, the visual attributes correspond to or reflect the corresponding musical attributes. For example, the addition of a cowboy hat might correspond to a strong country-music influence code 192, or the selection of dreadlocks might correspond to a strong reggae influence code 192. In addition, different attributes can cause a fusion of styles in certain embodiments of the invention.

Figure 12:
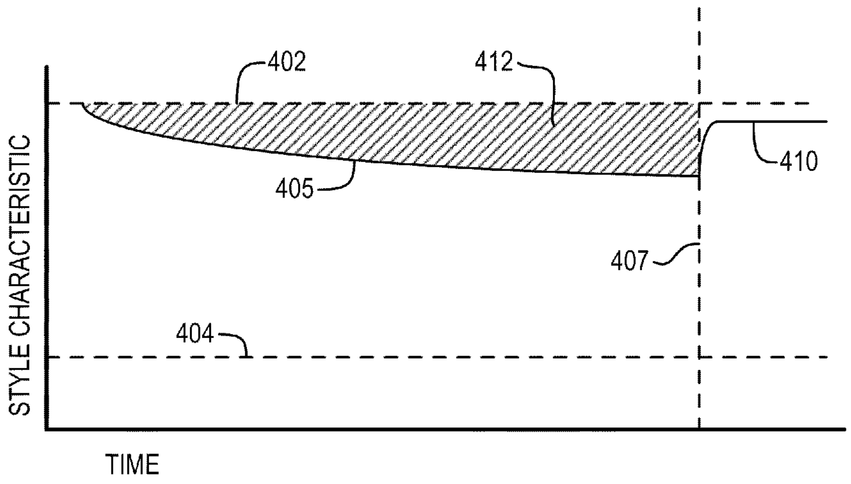
FIG. 12 illustrates a timeline showing one example of how a musical style characteristic can change over time due to an immediate interaction, according to a representative embodiment of the present invention.

A still further factor that might affect current playing style 380 is the current interaction 382 in which the avatar is engaging. That is, in certain embodiments the avatar is immediately influenced by the other avatars with which it is playing, e.g., resulting in the avatar performing in a musical style that is a fusion of its own individual style and the styles of the other avatars with which it is interacting. An example is shown in FIG. 12, which illustrates how a single style characteristic (or identification code) can vary over time based on an interaction with another avatar. The current avatar has an initial value of a particular style characteristic (say, boisterousness) indicated by line 402, and the avatar with which it is playing has an initial value indicated by line 404. After some period of time playing together, the value of the characteristic moves 405 closer to the value 404 for the avatar with which it is playing (e.g., its style of play becomes more relaxed or mellow). When the session ends 407 so that the two avatars are no longer playing together, the characteristic value returns to a value 410 that is close, but not identical, to its original value 402, indicating that the experience of playing with the other avatar has had some lasting impact on the current avatar.

While this example is for a single characteristic value, a number of characteristic values can change in this manner, both immediately during the particular musical interaction that is occurring and also over time. As a result, a single avatar can perform a selected musical composition using a style that is a fusion of its own individual style and that of the other avatar with which it is "jamming". In addition, the individual avatars can learn and evolve, potentially acquiring new musical segments at the same time. Due to this capability, as well as the preferred randomness built into the selection of musical segments and the musical variations 321 applied to them, the interactions between any two avatars often will be different. Also, although the value for only one of the avatars is shown as changing in FIG. 12, in the preferred embodiments both values would be moving closer toward each other. Still further, although the change is shown as being smooth and gradual, in the preferred embodiments variations occur within the entire space 412 (either in a predetermined or random manner) so as to simulate real-life learning processes.

Preferably, the entire timeline shown in FIG. 12 occurs over a period of minutes or tens of minutes. It is noted that the personality code preferably comes closer to but does not become identical with the corresponding code for the device with which the current avatar is playing, even if the two were to play together indefinitely. That is, a base personality code 381 preferably is the dominant factor and can only be changed within a single interaction session to a certain extent (which extent itself might be governed by another personality code, e.g., one designated "openness to change").

As discussed above, the present system can allow two avatars to "jam" together on an automated basis, forming a unique relationship among melody, harmony and overall sound. For example, a unique song or multi-part composition can be chosen in whole from, and/or constructed from smaller segments within, an existing music library. Then, the selected song or composition can be further modified based on musical style characteristics of one or more of the participating avatars.

In addition to the other identification and personality codes (e.g., stored in database 192) discussed herein, such codes can also include unique relationship codes, expressing the state of the relationship between two specific avatars. Such codes indicate how far along in relationship the two avatars are (e.g., whether they just met or are far along in the relationship), as well as the nature of the relationship (e.g., friends or in-love). As result, the relationships between avatars can vary, not only based on time and experience, but also based on the nature and length of relationships.

One aspect of the present invention is the identification of another avatar that is the current avatar's soul mate. In such a case, associated codes can identify two avatars that should be paired and, when they come in contact with each other, engage in an entirely different manner than any other pair of avatars. Alternatively, avatars merely can be designated as compatible with each other, so the two compatible avatars can develop a love relationship given enough time together. Still further, any combination of these approaches can be employed.

Additional Features

In addition to the musical interaction functionality described above, in the various embodiments of the present invention, server 20 provides any or all of the following functionality within the virtual environment. Certain embodiments allow a user to: move the user's avatar through the virtual environment in order to explore and/or visit notable landmarks; cause the user's avatar to interact with other avatars using a limited set of verbal and/or non-verbal expressions (e.g., so as to limit the possibility for potential abuse of communication); cause the user's avatar to communicate with other avatars using arbitrary verbal and/or non-verbal expressions (e.g., provided by the user through a keyboard, microphone or other interface on his or her client device 25 (e.g., on an opt-in basis by each individual user or the user's guardian); cause the user's avatar to dance, either alone or in synchronization with another avatar (e.g., with the specific dance patterns being selected or acquired for the one or more avatars in a manner similar to any of the ways in which musical sequences are selected and/or acquired above); cause the user's avatar to participate in games with other avatars; store and spend points earned by the user's avatar in any of such games; cause the user's avatar to interact with and manipulate items in the virtual environment (e.g., household items in the avatar's assigned house or items pertaining to any of a variety of different building types); cause the user's avatar to snap a photograph of the scene that the avatar currently is viewing (e.g., by selecting and using a virtual camera) and then save and/or display the photograph (e.g., in a frame or photo album within the avatar's virtual home environment); and/or cause the user's avatar to ride, drive, pilot or navigate a car, boat, train, hot air balloon, plane or helicopter around the virtual environment.

In addition to (or instead of) communications that are verbal in nature (such as the kinds of text-based or speech-based chatting noted above), certain embodiments of the present invention also provide for various kinds of music-based chatting. In one, the users select combinations of individual notes and/or pre-stored musical segments or phrases to be communicated between their respective avatars. Such a musical conversation can be further enhanced by assigning different meanings to different musical phrases, combinations of notes and/or even individual notes and making those meanings known to be participating users, so that the users are able to learn and communicate in a musical language.

According to a somewhat different approach to musical chatting, text-based messages are translated or converted into musical expressions using a pre-specified algorithm. For example, individual words and/or verbal expressions can be translated on a one-to-one basis to a corresponding musical sound (e.g., with the word "love" being translated to a "sighing" sound from a horn). In another example, the translation is performed (at least in part) by: parsing the submitted text-based message into phrases or clauses, identifying key words in each, retrieving a pre-stored musical sequence from a database based on such key words (e.g., using a scoring technique), and then stringing together the musical sequences in the same order in which their respective verbal phrases or clauses appear in the original text-based message. In addition, or instead, in certain embodiments a text-to-speech algorithm for producing natural-sounding speech is used to identify a voice modulation pattern for the original text-based message, and then the retrieved musical sequence(s) are based on this voice modulation pattern, e.g., using a scoring-based pattern-matching technique to identify a stored musical sequence that has a similar modulation pattern (e.g., as indicated by pre-stored data regarding the modulation patterns of the stored musical sequences).

It is noted that any of the music performed by an avatar, as contemplated herein (e.g., fully or partially automated musical interactions and/or musical chatting), may be played through a single "voice", such as the musical instrument assigned to the avatar. Alternatively, at least some of the avatars have different "voices" that are used at different times and/or for different purposes. For instance, in the primary example given herein, in which the avatars are configured as fictionalized birds, the assigned musical instrument might be used for jamming sessions (e.g., the fully or partially on the musical interactions), while a chirping or whistling voice is used for musical chatting.

The kinds of games that the avatars might be allowed to play include, e.g., a Simon-type game in which players are required to repeat a musical pattern; various games in which the player is required to find or hunt for one or more objects and/or mobile characters (such as an avatar that is being manipulated by another player or a character that moves in an automated fashion based on pre-specified rules, e.g., in either such case, a Marco Polo game in which the avatars and/or other characters call and respond musically or a game in which the hunted object or character has to be photographed); games in which the player is required to solve a mystery; games in which the player is required to find or otherwise earn or acquire a complete set of musical notes (e.g., and then play or arrange them in the proper order); and/or any of the games described in commonly assigned U.S. patent application Ser. No. 11/539,179, which application is incorporated by reference herein as though set forth herein in full, or any variations on such games (e.g., in which the avatars also or instead encounter questions along their travels within the virtual environment and can earn points by answering them correctly).

In certain embodiments, in which either pre-canned or arbitrary verbal communications are permitted between avatars, server 20 (or the client software running on the applicable client device 25) modifies the speech or other verbal communication, such as by shifting it up or down in frequency, e.g., in order to correspond to characteristics selected for or assigned to the user's avatar. For example, if a first user causes her avatar to say the pre-canned expression "hi", the system 10 may cause it to be vocalized at a higher pitch (based on a female gender selection or selection of a high-pitched voice) than when a second user causes his avatar to say the same word (based on a male gender selection or selection of a low-pitched voice). Similarly, if the users are permitted to communicate through a microphone on their corresponding user devices 25-28, the system 10 may modify the sound of their voice is based on attributes selected for or assigned to their avatars. In certain embodiments, users are permitted: (1) to upload a file to be used as his or her avatar's voice; and/or (2) to customize the avatar's voice through a user interface, e.g., by selecting characteristics such as pitch, timbre, pace, cadence or level of exuberance.

In certain embodiments of the invention, a user has the ability to choose an existing musical piece or even upload an entirely new music (or other sound) file, and then one or more users can initiate a trigger event causing their corresponding avatars to dance/jam to it. When the music is new, server 20 preferably: (1) analyzes it in order to identify the beat and corresponding tempo; and/or (2) if identification information has been provided along with the new musical sequence, retrieves the beat and tempo information, and/or any other information (such as musical genre), from a pre-populated database. In any event, the dance moves for the individual avatars preferably are modified based on the available information for the chosen or uploaded musical piece, e.g., by selecting moves appropriate to the musical genre and synchronizing the dance moves to the identified beat/tempo.

In certain embodiments, the users can directly jam with each other, e.g., with one player plugging in her guitar peripheral instrument and another plugging in his keyboard peripheral instrument and then playing together live, e.g., through their avatars. In addition, in certain embodiments such jam sessions allow the users to spontaneously create new music through their virtual instruments and/or layer in previously recorded tracks, in any desired combination. Still further, such jamming preferably can occur within a virtual recording studio in which the jam sessions are recorded for future playback and, in some cases, for subsequent editing.

It is noted that the avatars described herein generally correspond to the musically interacting devices in the '433 application, and can be provided with any of the functionality described for such devices. However, in the present case such functionality typically will be provided through the server 20 and/or the applicable client devices 25-28.

System Environment.

Generally speaking, except where clearly indicated otherwise, all of the systems, methods, functionality and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive or a solid-state drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, workstations, personal computers and/or even smaller computers, such as PDAs, wireless telephones or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible media on which are stored software or firmware program instructions (i.e., computer-executable process instructions) for performing the methods and functionality of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server device, computer-readable medium or other storage device, client device, or any other kind of device, such references should be understood as encompassing the use of plural such processors, computers, server devices, computer-readable media or other storage devices, client devices, or any other devices, except to the extent clearly indicated otherwise. For instance, a server generally can be implemented using a single device or a cluster of server devices (either local or geographically dispersed), e.g., with appropriate load balancing.

Additional Considerations.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A system for facilitating remote interaction, comprising:
- a server configured to host a virtual environment; and
- a plurality of client devices communicating with the server over an electronic network, each said client device configured to interact within the virtual environment through a corresponding avatar,
- wherein a first client device accepts commands from a first user and, in response, communicates corresponding information to the server causing a modification of any of a first set of user-customizable visual characteristics of a first avatar that represents the first user,
- wherein a second client device accepts commands from a second user and, in response, communicates corresponding information to the server causing a modification of any of a second set of user-customizable visual characteristics of a second avatar that represents the second user, and
- wherein the first avatar performs a musical sequence that is based on current settings for: the first set of user-customizable visual characteristics and the second set of user-customizable visual characteristics.

2. A system according to claim 1, wherein the user commands accepted by the first client device also comprise a start command for the first avatar to initiate performance of the musical sequence.

3. A system according to claim 1, wherein the first avatar automatically initiates performance of the musical sequence based on at least one of: (1) proximity to the second avatar within the virtual environment or (2) a pre-specified interaction with the second avatar.

4. A system according to claim 1, wherein each of the visual characteristics in the first set of user-customizable visual characteristics corresponds to a different musical characteristic, and different settings for each of said visual characteristics result in different settings for the corresponding musical characteristic.

5. A system according to claim 1, wherein the second avatar performs a second musical sequence in accompaniment with the musical sequence performed by the first avatar.

6. A system according to claim 5, wherein the second musical sequence is based on settings for the first set of user-customizable visual characteristics.

7. A system according to claim 1, wherein the first set of user-customizable visual characteristics comprises at least two of: a body style, a color and an eye design.

8. A system according to claim 1, wherein the first set of user-customizable visual characteristics comprises at least one of: a plume design and a beak design.

9. A system according to claim 1, wherein the first client device provides a user interface for allowing the first user to modify at least one of a tonal composition of the musical sequence and a tempo of the musical sequence.

10. A system according to claim 9, wherein the user interface comprises an alphanumeric keyboard or keypad.

11. A system for facilitating remote interaction, comprising:
- a server configured to host a virtual environment; and
- a plurality of client devices communicating with the server over an electronic network, each said client device configured to interact within the virtual environment through a corresponding avatar,
- wherein a first client device accepts commands from a first user and, in response, communicates corresponding information to the server causing a modification of a musical style of a first avatar that represents the first user, and wherein, based on at least one of proximity to or interaction with a second avatar, the first avatar performs a musical sequence in a fusion musical style that is a combination of the musical style of the first avatar and the musical style of the second avatar.

12. A system according to claim 11, wherein the musical style of the first avatar has a substantially greater influence on the fusion musical style than the musical style of the second avatar.

13. A system according to claim 11, wherein, when alone, the first avatar performs a musical sequence in the musical style of the first avatar only.

14. A system according to claim 11, wherein an influence of the musical style of the second avatar on musical performances by the first avatar increases with increasing duration of said at least one of proximity to or interaction with the second avatar.

15. A system according to claim 14, wherein said increase in the influence of the musical style of the second avatar occurs during performance of said musical sequence.

16. A system according to claim 11, wherein:

the second avatar represents a second user, and a second client device accepts commands from the second user and, in response, communicates corresponding information to the server causing a modification of the musical style of the second avatar.

17. A system according to claim 11, wherein, based on said at least one of proximity to or interaction with the second avatar, the second avatar performs an accompanying musical sequence to the musical sequence performed by the first avatar.

18. A system according to claim 17, wherein:

the accompanying musical sequence performed by the second avatar is in a second fusion musical style that is a combination of the musical style of the second avatar and the musical style of the first avatar, and the musical style of the second avatar has a substantially greater influence on the second fusion musical style than the musical style of the first avatar.

* * * * *